(12) United States Patent
Shibamoto et al.

(10) Patent No.: US 8,276,957 B2
(45) Date of Patent: Oct. 2, 2012

(54) ROBOT HAND AND FINGER MECHANISM

(75) Inventors: Yusuke Shibamoto, Azumino (JP);
Masaru Kobayashi, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 0 days.

(21) Appl. No.: 13/408,666

(22) Filed: Feb. 29, 2012

(65) Prior Publication Data

US 2012/0153655 A1    Jun. 21, 2012

Related U.S. Application Data

(62) Division of application No. 12/416,254, filed on Apr. 1, 2009, now Pat. No. 8,167,346.

(30) Foreign Application Priority Data

Apr. 22, 2008 (JP) ................. 2008-111572

(51) Int. Cl.
*B66C 1/00* (2006.01)
*B66C 1/42* (2006.01)

(52) U.S. Cl. ...................... 294/106; 294/115

(58) Field of Classification Search .................. 294/106, 294/202, 115, 198; 414/729, 740; 901/21, 901/30, 31, 39; 269/254 CS
See application file for complete search history.

(56) References Cited

U.S. PATENT DOCUMENTS

| | | | |
|---|---|---|---|
| 3,694,021 | A | 9/1972 | Mullen |
| 4,921,293 | A | 5/1990 | Ruoff et al. |
| 4,957,320 | A | 9/1990 | Ulrich |
| 5,378,033 | A | 1/1995 | Guo et al. |
| 6,913,627 | B2 | 7/2005 | Matsuda |
| 2007/0063523 | A1 | 3/2007 | Koyama |

FOREIGN PATENT DOCUMENTS

JP    2000-218583 A    8/2000

*Primary Examiner* — Dean Kramer
*Assistant Examiner* — Stephen Vu
(74) *Attorney, Agent, or Firm* — Buchanan Ingersoll & Rooney PC

(57) ABSTRACT

A robot hand converts the longitudinal extending and retracting motion of an actuating rod of a linear actuator into opening and closing motion of left and right first links via a link mechanism. The link mechanism includes left and right middle links composed of coil springs. When the left and right first links come in contact with an object to be gripped, the middle links elastically deform and expand, and the force gripping the object gradually increases due to the elastic deformation of the middle links. It is possible to prevent a large gripping force from acting suddenly on the object and to prevent the object from being deformed, damaged, or otherwise suffering harmful effects.

7 Claims, 5 Drawing Sheets

ROBOT HAND AND FINGER MECHANISM

This application is a divisional of U.S. patent application Ser. No. 12/416,254 filed Apr. 1, 2009, which has been issued as U.S. Pat. No. 8,167,345 on May 1, 2012.

TECHNICAL FIELD

The present invention relates to a robot hand comprising a finger mechanism configured from a link mechanism. The present invention particularly relates to a robot hand suitable for gripping flexible objects that readily deform, objects made of fragile material that readily breaks, and the like; and to a finger mechanism constituting the robot hand.

BACKGROUND ART

One known example of a gripping mechanism or robot hand configured to grip balls and other objects using a pair of left and right gripping implements is one having a mechanism for converting drive force from a drive source into the opening and closing movements of the left and right gripping implements via a link mechanism. Patent Document 1 discloses a gripping device in which the movement of a linearly moving cylinder rod is converted via a link mechanism into movement for opening and closing the final left and right links.

[Patent Document 1] JP-A 2000-218583

In order for an object to be gripped or held by the final left and right links in a gripping mechanism or robot hand using a link mechanism, the torque applied to the links is controlled according to the opened or closed positions of the links in order to control the gripping force or holding force applied to the links. However, it is difficult to control the torque applied to the links so as to obtain the appropriate object-gripping force or object-holding force according to the opened or closed positions of the links, and the object-gripping force or object-holding force cannot be accurately adjusted.

Particularly in cases in which a flexible object is gripped, the object is compressed and deformed by the links; therefore, with only torque control based on link position control, it is difficult to implement control for gripping or holding a flexible object without compressing the object. In cases of gripping an object made of a fragile material, there is a danger that the object will be damaged. Furthermore, with only torque control based on link position control, there is a limit to the size of the object that can be gripped or held by an appropriate gripping force or holding force.

DISCLOSURE OF THE INVENTION

In light of these problems, it is an object of the present invention to provide a finger mechanism of a robot hand suitable for gripping an object without deforming or damaging the object, and a robot hand that uses the finger mechanism.

In order to resolve the problems described above, the finger mechanism of a robot hand and the robot hand of the present invention are characterized in comprising the following configuration. The numerical symbols inside parentheses are used in the embodiments of the present invention to make the present invention easier to understand, but are not intended to limit the present invention to the embodiments.

The finger mechanism of a robot hand of the present invention according to a first aspect is characterized in comprising:

a first link (11) capable of turning left and right about a first fulcrum (12) from a neutral position (11B) of extending in the longitudinal direction;

a second link (16) capable of turning left and right about a second fulcrum (18) placed at a position behind the first fulcrum (12), from a neutral position (16B) of extending in the longitudinal direction;

a middle link (13) having one end linked to a first panel point (14) behind the first fulcrum (12) of the first link (11), and another end linked to a second panel point (17) in front of the second fulcrum (18) of the second link (16), the middle link (13) being composed of an elastic member capable of expanding and contracting in the direction in which the first panel point (14) and second panel point (17) approach and separate in the transverse direction;

a third link (20) having one end linked to a third panel point (21) behind the second fulcrum (18) of the second link (16) and being capable of rectilinear movement in the transverse direction; and a drive mechanism (5, 6, 23) for moving the third link (20) back and forth in a rectilinear manner.

In the finger mechanism of a robot hand of the present invention, the middle link made of an elastic member is disposed within the link mechanism. The first link is made to pivot by the drive mechanism to the left and right about the first fulcrum via the third link, the second link, and the middle link, whereby an operation of forcing out or otherwise manipulating a gripped object can be performed by the first link. The elastic member of the middle link functions as a cushioning member for the force acting on the first link from the side near the drive mechanism; therefore, when the first link comes in contact with the gripped object, a large impact force does not act on the gripped object.

Consequently, unlike a finger mechanism that uses a link mechanism configured only from links composed of rigid members, it is possible to easily achieve an action of manipulating an object composed of a flexible material without deforming the object, an action of manipulating an object composed of a fragile material without damaging the object, and other such actions.

If the middle link composed of an elastic member is attached in a detachable manner, the manipulative force applied to the object from the first link can be varied by replacing the middle link. Therefore, it is possible to easily achieve a finger mechanism capable of generating manipulative force suited to the object to be manipulated.

Furthermore, a damping device (31) for suppressing the expansion and contraction of the middle link (13) can be attached to the first panel point (14) of the middle link (13). When an external force acts on the first link from the side near the object while the object is being manipulated by the first link, the middle link composed of an elastic member vibrates, and there is a possibility that the manipulation of the object by the first link will become unstable. If the damping device is attached in order to prevent such harmful effects, the manipulation of the object by the first link can be stabilized. Fluctuations in the manipulative force on the object by the first link can be suppressed, and the manipulative force becomes easy to control.

Furthermore, an object-gripping member (42) can be attached to the distal end of the first link (11) in a state of being capable of turning left and right about the neutral position of extending in the longitudinal direction; a first wire (45) can be wound via pulleys (43, 44) placed in established positions between the region of the object-gripping member (42) on one side of the turning center, and the region of the first link (11) behind the left first fulcrum (12); and a second wire (46) can be wound via the pulleys (43, 44) between the region of the object-gripping member (42) on the other side of the turning center, and the region of the second link (16) nearer to the distal end than the second fulcrum (18).

Since the distances by which the first link (gripping side) and the second link (drive side) move are substantially the same until contact is made with the object, the object-gripping member linked to the first wire and second wire moves together with the first link and does not turn on its own. After the object-gripping member has come in contact with the object, the first link on the gripping side is restrained from moving, and the second link on the drive side moves in order to apply force to the object to be gripped. Therefore, only the second wire linked to the second link is pulled, the rear end of the object-gripping member is pulled, and the distal end turns in a direction of inclining toward the object. Since the object-gripping member is in contact with the object, the manipulative force applied to the object by the object-gripping member increases.

Next, a robot hand capable of gripping and holding an object can be configured by placing finger mechanisms having the above-described configuration in bilateral symmetry.

Specifically, the robot hand (1) of the present invention is characterized in comprising:

a left first link (11) and a right first link (11) capable of turning left and right about a left first fulcrum (12) and a right first fulcrum (12) in bilaterally symmetric positions, from neutral positions (11B) of extending in the longitudinal direction;

a left second link (16) and a right second link (16) capable of turning left and right about a left second fulcrum (18) and a right second fulcrum (18) in bilaterally symmetric positions behind the left first fulcrum (12) and the right first fulcrum (12), from neutral positions (16B) of extending in the longitudinal direction;

a left middle link (13) having one end linked to a left first panel point (14) behind the left first fulcrum (12) of the left first link (11), and another end linked to a left second panel point (17) in front of the left second fulcrum (18) of the left second link (16), the left middle link (13) being composed of an elastic member capable of expanding and contracting in the direction in which the left first panel point (14) and left second panel point (17) approach and separate in the transverse direction;

a right middle link (13) having one end linked to a right first panel point (14) behind the right first fulcrum (12) of the right first link (11), and another end linked to a right second panel point (17) in front of the right second fulcrum (18) of the right second link (16), the right middle link (13) being composed of an elastic member capable of expanding and contracting in the direction in which the right first panel point (14) and right second panel point (17) approach and separate in the transverse direction;

a left third link (20) having one end linked to a left third panel point (21) behind the left second fulcrum (18) of the left second link (16) and being capable of rectilinear movement in the transverse direction;

a right third link (20) having one end linked to a right third panel point (21) behind the right second fulcrum (18) of the right second link (16) and being capable of rectilinear movement in the transverse direction; and a drive mechanism (5, 6, 23) for moving the left third link (20) and the right third link (20) back and forth in a rectilinear manner in opposite directions.

In the robot hand having this configuration, the drive force of the drive mechanism is transmitted to the left and right first links from the left and right third links via the left and right second links and the left and right middle links, and the left and right first links undergo opening and closing motions.

When the left and right third links are made to move towards each other by the drive mechanisms, the left and right first links pivot about the left and right first fulcra in directions that make their distal end portions close towards each other. An object positioned in between these portions can be gripped, and a holding state can be achieved in which the object remains gripped between these portions.

Since the drive force of the drive mechanisms is transmitted from the left and right elastic members to the left and right first links via the middle links, it is possible to prevent a large gripping force from acting suddenly on the object gripped in between the first links. Consequently, it is possible to easily achieve an action of gripping an object composed of a flexible material without deforming the object, or an action of gripping an object composed of a fragile material without damaging the object.

By replacing the left and right middle links to vary their elastic characteristics, the gripping force of the left and right first links can be made to be a gripping force and holding force suited to the object to be gripped.

A left damping device (31) for suppressing the expansion and contraction of the left middle link (13) may be attached to the left first panel point (14) of the left middle link (13), and a right damping device (31) for suppressing the expansion and contraction of the right middle link (13) may be attached to the right first panel point (14) of the right middle link (13).

A left object-gripping member (42) can be attached to the distal end of the left first link (11) in a state of being capable of turning left and right about the neutral position of extending in the longitudinal direction; a left first wire (45) can be wound via left pulleys (43, 44) placed in established positions between the region of the left object-gripping member (42) on one side of the turning center, and the region of the left first link (11) behind the left first fulcrum (12); and a left second wire (46) can be wound via left pulleys (43, 44) placed in established positions between the region of the left object-gripping member (42) on the other side of the turning center, and the region of the left second link (16) nearer to the distal end than the left second fulcrum (18).

Similarly, a right object-gripping member (42) can be attached to the distal end of the right first link (11) in a state of being capable of turning left and right about the neutral position of extending in the longitudinal direction; a right first wire (45) can be wound via right pulleys (43, 44) placed in established positions between the region of the right object-gripping member on one side of the turning center, and the region of the right first link (11) behind the right first fulcrum (12); and a right second wire (46) can be wound via right pulleys (43, 44) between the region of the right object-gripping member (42) on the other side of the turning center, and the region of the right second link (16) nearer to the distal end than the right second fulcrum (18).

Next, the drive mechanism can comprise a linear actuator provided with an actuating rod that reciprocates rectilinearly in the longitudinal direction, a drive link fixed to the actuating rod and extending left and right, a left fourth link linked between the left end of the drive link and the right end of the left third link, and a right fourth link linked between the right end of the drive link and the left end of the right third link.

BEST MODE FOR CARRYING OUT THE INVENTION

Embodiments of a robot hand in which the present invention is applied are described hereinbelow with reference to the drawings.

(Embodiment 1)

Figure 1:
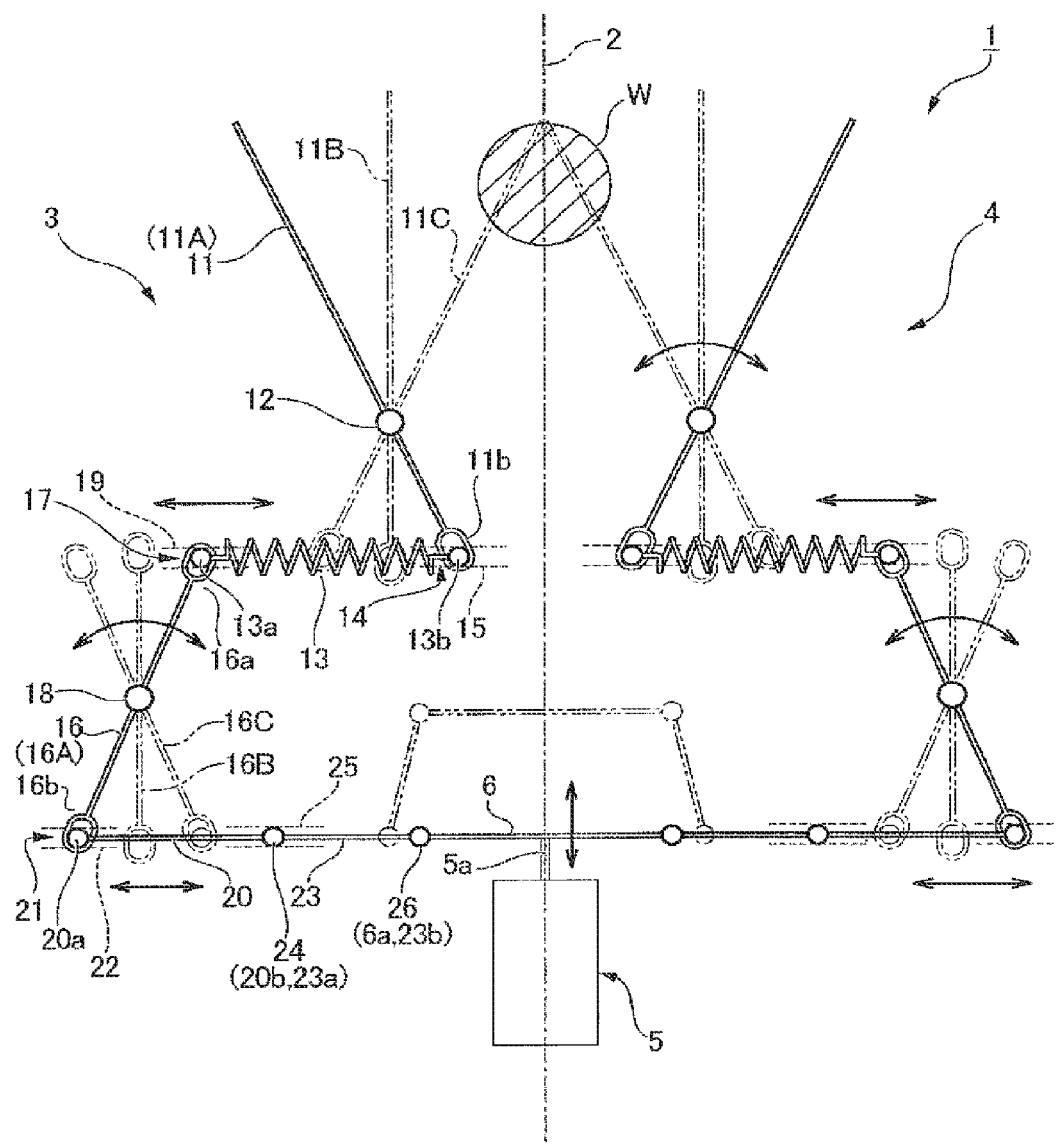
FIG. 1 is a schematic structural diagram that shows a robot hand according to Embodiment 1 in which the present invention is applied.

FIG. 1 is a schematic structural diagram that shows a robot hand according to Embodiment 1. A robot hand 1 has a left finger mechanism 3 and a right finger mechanism 4 comprising a structure that is bilaterally symmetric about a center axis line 2 extending in the longitudinal direction in the same plane, and a linear actuator 5 for driving the finger mechanisms.

The left finger mechanism 3 comprises a left first link 11 composed of a rectilinear rigid member. The left first link 11 is capable of turning about a left first fulcrum 12 positioned at a rear side of the center along the axial line of the first link; from an open position 11A of being turned outward (to the left), through a neutral position 11B of extending in the longitudinal direction, to a closed position 11C of being turned inward (to the right). At the rear end 11b of the left first link 11 is formed a first panel point 14, where an inside end 13b of a left middle link 13 extending along the lateral direction is rotatably linked. The first panel point 14 is capable of moving only along the lateral direction by a linear guide 15, and the first panel point 14 supports the rear end 11b in a state that allows the left first link 11 to turn.

The middle link 13 is configured from an elastic member, or from a tension coil spring in the present example. At the outside end 13a of the middle link 13 is formed a second panel point 17 where a front end 16a of a left second link 16 composed of a rectilinear rigid member is rotatably linked. The left second link 16 is capable of turning about a left second fulcrum 18 positioned at the center along the axial line thereof; from a closed position 16A of being turned inward, through a neutral position 16B of extending in the longitudinal direction, to an open position 16C of being turned outward. The second panel point 17 is capable of moving only along the lateral direction by a linear guide 19, and the second panel point supports the front end 16a in a state that allows the left second link 16 to turn.

At the rear end 16b of the left second link 16 is formed a third panel point 21 where an outside end 20a of a left third link 20 composed of a rectilinear rigid member is linked. The third panel point 21 is capable of moving only along the lateral direction by a linear guide 22, and the third panel point supports the rear end 16b in a state that allows the left second link 16 to turn.

At the inside end 20b of the left third link 20 is formed a fourth panel point 24 where an outside end 23a of a left fourth link 23 composed of a rectilinear rigid member is rotatably linked. The fourth panel point 24 is capable of moving only along the lateral direction by a linear guide 25.

Formed at the inside end 23b of the left fourth link 23 is a fifth panel point 26 rotatably linked to the left end 6a of a drive link 6 composed of a rectilinear rigid member extending laterally. The drive link 6 is fixed in a state of extending laterally at the distal end of an actuating rod 5a that extends and retracts in the longitudinal direction of a linear actuator 5.

The right finger mechanism 4 has a structure that is bilaterally symmetrical to the left finger mechanism 3 about the center axis line 2, as previously described. Therefore, the right finger mechanism 4 will not be described, and corresponding portions in the following action description are denoted by the same numerical symbols as those used for the left finger mechanism 3.

Figure 2:
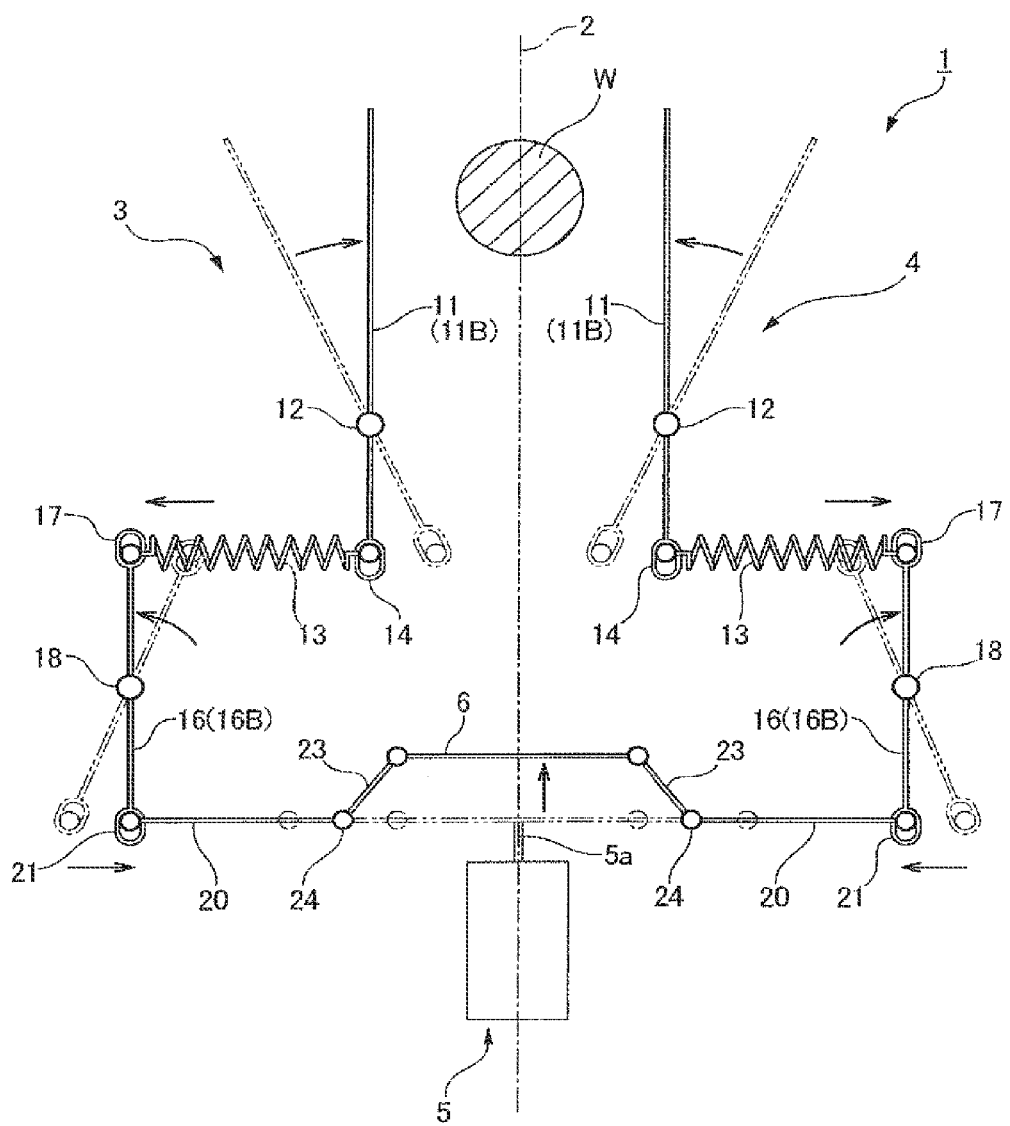
FIG. 2 is a descriptive diagram that shows the object-gripping action of the robot hand in FIG. 1.
Figure 3:
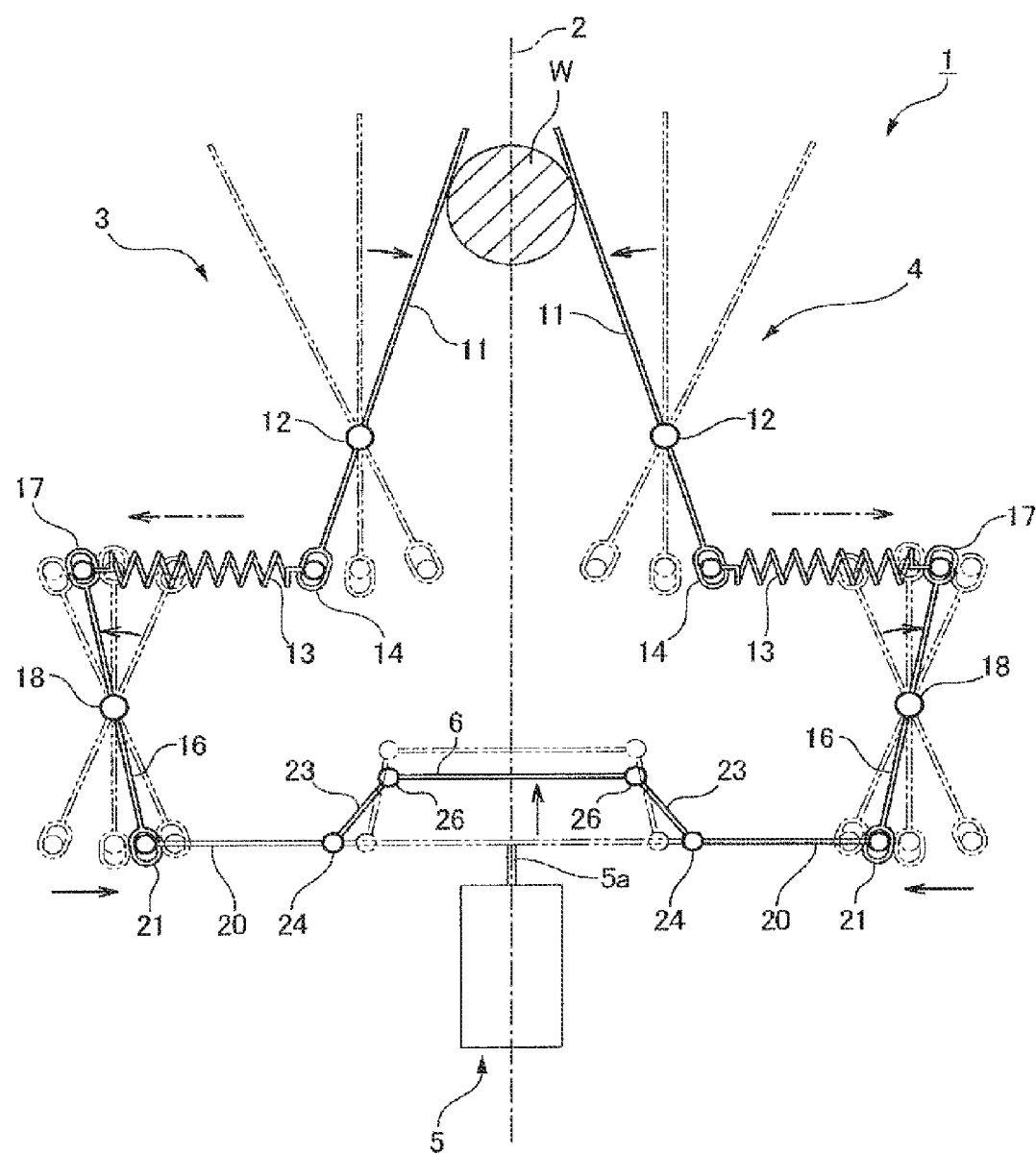
FIG. 3 is a descriptive diagram that shows the object-gripping action of the robot hand in FIG. 1.

FIGS. 2 and 3 are descriptive diagrams that show the object-gripping action of the robot hand 1. The left and right first links 11 of the robot hand 1 are in the open positions 11A, as shown in FIG. 1. In this state, the robot hand 1 is positioned using a drive mechanism (not shown) so that an object W to be gripped is positioned between the first links.

When the linear actuator 5 is driven to push the actuating rod 5a forward from the withdrawn position shown in FIG. 1, the drive link 6 fixed thereto is pushed forward. When the drive link 6 is pushed forward, the inside ends 23b of the left and right fourth links 23 linked to the drive link are pushed forward, and the outside ends 23b are guided by the linear guides 25 and pulled inward. The left and right third links 20 linked to the left and right fourth links 23 are thereby also pulled inward, and the left and right second links 16 whose rear ends 16b are linked to the outside ends 20a are turned about the second fulcra 18 and opened outward from the inside closed positions 16A. The left and right first links 11, which are linked via the left and right middle links 13 to the left and right second links 16, turn about the first fulcra 12 and close inward from the outside open positions 11A. FIG. 2 shows a state in which the left and right first links 11 and the left and right second links 16 have turned to the neutral positions 11B, 16B of extending in the longitudinal direction.

When the linear actuator 5 is further driven to extend the actuating rod 5a, the distal end portions of the left and right first links 11 move to a gripping state of being in contact with both sides of the gripped object W positioned in between these portions, as shown in FIG. 3. The actuating rod 5a of the linear actuator 5 is then extended to open the left and right second links 16 to the open positions 16C. The left and right first links 11 do not move since they are in contact with the object W, and the middle links 13 expand, being composed of coil springs linking the first links 11 and the second links 16. Therefore, the spring force which increases along with the expansion of the middle links 13 acts as object-holding force through the left and right first links 11, creating a state in which the object W is held.

Thus, after the left and right first links 11 have come in contact with the object W, the force by which the object W is gripped gradually increases. The gripping force gradually increases after the object is gripped, regardless of the position in which the object is gripped by (the position where the object is in contact with) the left and right first links 11. If the elastic characteristics of the middle links 13 are appropriately set, a flexible object can be gripped without being deformed. A fragile object can also be gripped without being damaged. If the middle links 13 are capable of being detached, a gripping force suited to the object to be gripped can be obtained in a simple manner by replacing the middle links with links having the appropriate elastic characteristics.

(Embodiment 2)

Figure 4:
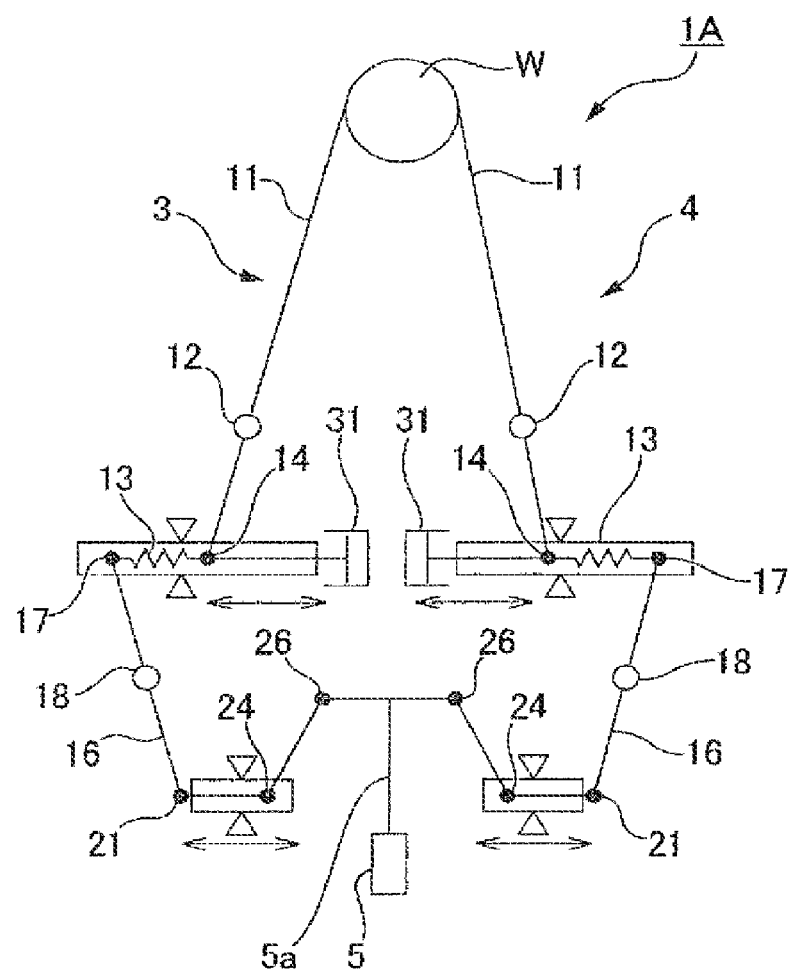
FIG. 4 is a schematic structural diagram that shows a robot hand according to Embodiment 2 in which the present invention is applied.

FIG. 4 is a schematic structural diagram that shows a robot hand according to Embodiment 2 in which the present invention is applied. Since the essential structure of the robot hand 1A is the same as that of the robot hand 1 of Embodiment 1, corresponding portions are denoted by the same numerical symbols and are not described.

The robot hand 1A is provided with a left damping device 31 and a right damping device 31 for suppressing vibration in the left middle link 13 and the right middle link 13. The left damping device 31 is linked to the first panel point 14 on the internal side of the left middle link 13. Similarly, the right damping device 31 is linked to the first panel point 14 on the internal side of the right middle link 13.

In cases in which the object W is gripped while the middle links 13 composed of tension coil springs are in a stretched state as shown in FIG. 4, vibration is created by the tension coil springs. Therefore, the gripping force on the object W also fluctuates. Attaching the damping devices 31 makes it possible to minimize this fluctuation and to apply stable force to the object W. This also has the advantage of making it easier to control the gripping force because there is less force fluctuation.

The damping characteristics of the damping devices 31 are preferably set in accordance with the flexibility and other characteristics of the object W to be gripped, and the elastic characteristics of the middle links 13.

(Embodiment 3)

Figure 5:
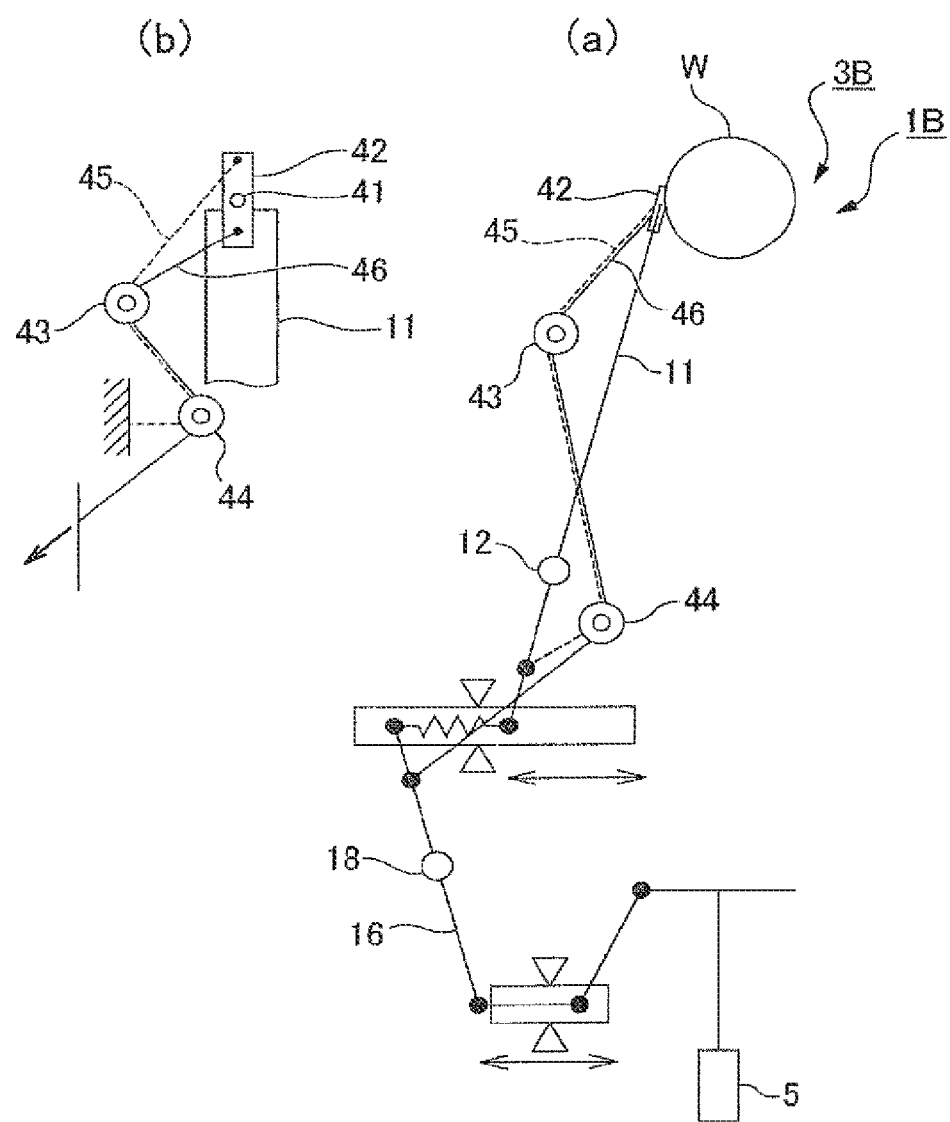
FIG. 5(a) is a schematic structural diagram that shows a robot hand according to Embodiment 3 in which the present invention is applied.
FIG. 5(b) is a descriptive diagram that shows the portion where the object-gripping member is attached.

FIG. 5 is a schematic structural diagram that shows a robot hand according to Embodiment 3 in which the present invention is applied, wherein only the left portion is shown. Since the essential structure of the robot hand 1B is the same as that of the robot hand 1 of Embodiment 1, corresponding portions are denoted by the same numerical symbols and are not described.

In the left finger mechanism 3B of the robot hand 1B, a left object-gripping member 42 is attached to the distal end of the left first link 11 in a state that allows the member to turn left and right about a left turning shaft 41. A left first wire 45 is wound via two left pulleys 43, 44 placed in established positions between the region of the left object-gripping member 42 nearer to the distal end than the turning shaft 41, and the region of the left first link 11 behind the left first fulcrum 12. The left pulley 43 is positioned in front of the left first fulcrum 12, the left pulley 44 is positioned behind the left first fulcrum, and the left first wire 45 is wound on the external side of the left pulley 43 and on the internal side of the left pulley 44.

A left second wire 46 is wound via the left pulleys 43, 44 between the region of the left object-gripping member 42 behind the turning shaft 41 and the region of the left second link 16 nearer to the distal end than the left second fulcrum 18. The second wire 46 is wound by both left pulleys 43, 44 from the same side as the first wire 45. The right finger mechanism of the robot hand 1B has the same configuration as the left finger mechanism 3B and has a bilaterally symmetric structure.

Until the left and right object-gripping members 42 at the distal ends of the left and right first links 11 come in contact with the object W, the first links 11 and the second links 16 move by the same amount, and the object-gripping members 42 move together with the first links 11 without turning.

According to this configuration, after contact is made with the object W, the object W can be gripped with a gripping force stronger than the gripping force regulated by the middle links 13 composed of tension coil springs. Specifically, when the second links 16 on the drive side are turned further in the gripping direction, the first wires 45 are not pulled because the first links 11 do not move, but when the second links 16 on the drive side move, the second wires 46 are pulled, and the object-gripping members 42 are pulled in a direction that makes their distal ends incline toward the object about the turning shaft 41. The result is that the object-gripping members 42 turn and the gripping force on the object W increases. Therefore, this is suitable for cases of gripping a rigid or heavy object W.

The first wires 45 may be linked to the sides of the object-gripping members 42 distal of the turning shaft 41, and the second wires 46 may be linked to the rear sides. In any case, it is preferable that the object-gripping members 42 move integrally with the first links 11 until the object W is gripped, after which time the object-gripping members 42 can be turned by the second wires 46.

(Other Embodiments)

In the examples described above, the robot hand is configured using two finger mechanisms. It is possible to manipulate an object using only one finger mechanism, and it is also possible to configure the robot hand using three or more finger mechanisms. Coil springs are used in the middle links, but it is also possible to use elastic members other than coil springs.

The invention claimed is:

1. A finger mechanism of a robot hand, comprising:
a first link capable of turning left and right about a first fulcrum from a neutral position of extending in a longitudinal direction;
a second link capable of turning left and right about a second fulcrum placed at a position behind the first fulcrum, from a neutral position of extending in the longitudinal direction;
a middle link having one end linked to a first panel point behind the first fulcrum of the first link, and another end linked to a second panel point in front of a second fulcrum of the second link, the middle link being composed of an elastic member capable of expanding and contracting in the direction in which the first panel point and second panel point approach and separate in a lateral direction;
a third link having one end linked to a third panel point behind the second fulcrum of the second link and being capable of rectilinear movement in the lateral direction; and
a drive mechanism for moving the third link back and forth in a rectilinear manner, and wherein
an object-gripping member is attached to a distal end of the first link in a state of being capable of turning left or right about a neutral position of extending in a longitudinal direction;
a first wire is rigged around pulleys placed in established positions between a region of the object-gripping member on one side of the turning center, and a region of the first link behind the left first fulcrum; and
a second wire is rigged around the pulleys between a region of the object-gripping member on the other side of the turning center, and a region of the second link nearer to a distal end than the second fulcrum.

2. The finger mechanism of a robot hand of claim 1, wherein
the middle link is linked to the first panel point and the second panel point in a removable state.

3. The finger mechanism of a robot hand of claim 1, wherein
a damping device for suppressing expansion and contraction of the middle link is attached to the first panel point of the middle link.

4. A robot hand comprising:
a left first link and a right first link capable of turning left and right about a left first fulcrum and a right first fulcrum in bilaterally symmetric positions, from neutral positions of extending in a longitudinal direction;

a left second link and a right second link capable of turning left and right about a left second fulcrum and a right second fulcrum in bilaterally symmetric positions behind the left first fulcrum and the right first fulcrum, from neutral positions of extending in the longitudinal direction;

a left middle link having one end linked to a left first panel point behind the left first fulcrum of the left first link, and another end linked to a left second panel point in front of the left second fulcrum of the left second link, the left middle link being composed of an elastic member capable of expanding and contracting in the direction in which the left first panel point and left second panel point approach and separate in a lateral direction;

a right middle link having one end linked to a right first panel point behind the right first fulcrum of the right first link, and another end linked to a right second panel point in front of the right second fulcrum of the right second link, the right middle link being composed of an elastic member capable of expanding and contracting in the direction in which the right first panel point and right second panel point approach and separate in the lateral direction;

a left third link having one end linked to a left third panel point behind the left second fulcrum of the left second link and being capable of rectilinear movement in the lateral direction;

a right third link having one end linked to a right third panel point behind the right second fulcrum of the right second link and being capable of rectilinear movement in the lateral direction; and a drive mechanism for moving the left third link and the right third link back and forth in a rectilinear manner in opposite directions, and wherein a left object-gripping member is attached to a distal end of the left first link in a state of being capable of turning left and right about a neutral position of extending in the longitudinal direction;

a left first wire is rigged around left pulleys placed in established positions between a region of the left object-gripping member on one side of the turning center, and a region of the left first link behind the left first fulcrum;

a left second wire is rigged around the left pulleys between a region of the left object-gripping member on the other side of the turning center, and a region of the left second link nearer to a distal end thereof than the left second fulcrum;

a right object-gripping member is attached to a distal end of the right first link in a state of being capable of turning left and right about a neutral position of extending in the longitudinal direction;

a right first wire is rigged around right pulleys placed in established positions between a region of the right object-gripping member on one side of the turning center, and a region of the right first link behind the right first fulcrum; and a right second wire is wound via right pulleys between a region of the right object-gripping member on the other side of the turning center, and a region of the right second link nearer to the distal end than the right second fulcrum.

5. The robot hand of claim 4, wherein
the left middle link and the right middle link are attached in a detachable state.

6. The robot hand of claim 4, wherein
a left damping device for minimizing expansion and contraction of the left middle link is attached to the left first panel point of the left middle link; and
a right damping device for minimizing the expansion and contraction of the right middle link is attached to the right first panel point of the right middle link.

7. The robot hand according to claim 4, wherein the drive mechanism comprises:
a linear actuator provided with an actuating rod that moves reciprocatingly in a rectilinear manner in the longitudinal direction;
a drive link fixed to the actuating rod and extending in the lateral direction;
a left fourth link linked between the left end of the drive link and the right end of the left third link; and
a right fourth link linked between the right end of the drive link and the left end of the right third link.

* * * * *